(12) United States Patent
Pakkanen et al.

(10) Patent No.: US 11,059,684 B2
(45) Date of Patent: Jul. 13, 2021

(54) APPARATUS FOR LOADING A CARGO SPACE

(71) Applicant: ACTIW OY, Naarajarvi (FI)

(72) Inventors: Jukka Pakkanen, Saynatsalo (FI); Reijo Viinonen, Pieksamaki (FI)

(73) Assignee: Actiw Oy, Naarajarvi (FI)

( * ) Notice: Subject to any disclaimer, the term of this patent is extended or adjusted under 35 U.S.C. 154(b) by 0 days.

(21) Appl. No.: 16/092,465

(22) PCT Filed: Apr. 25, 2017

(86) PCT No.: PCT/FI2017/050313
§ 371 (c)(1),
(2) Date: Oct. 10, 2018

(87) PCT Pub. No.: WO2017/187017
PCT Pub. Date: Nov. 2, 2017

(65) Prior Publication Data
US 2019/0161294 A1   May 30, 2019

(30) Foreign Application Priority Data

Apr. 25, 2016 (FI) ..................................... 20165357

(51) Int. Cl.
*B65G 67/20* (2006.01)
*B65G 57/03* (2006.01)

(52) U.S. Cl.
CPC .......... *B65G 67/20* (2013.01); *B65G 57/035* (2013.01)

(58) Field of Classification Search
CPC .............................. B65G 67/20; B65G 57/035
See application file for complete search history.

(56) References Cited

U.S. PATENT DOCUMENTS

| | | | |
|---|---|---|---|
| 3,727,369 | A | 4/1973 | Lassig |
| 4,171,178 | A | 10/1979 | Birkenfeld et al. |
| 9,952,588 | B2 | 4/2018 | Groth et al. |
| 2007/0140819 | A1 | 6/2007 | Piveteau et al. |
| 2012/0027555 | A1 | 2/2012 | Germain et al. |
| 2014/0244015 | A1 | 8/2014 | Groth et al. |
| 2015/0274447 | A1* | 10/2015 | McCollum ............. B25J 9/0093 414/792.6 |

(Continued)

FOREIGN PATENT DOCUMENTS

| CN | 1942377 | 4/2007 |
|---|---|---|
| CN | 201343171 | 11/2009 |

(Continued)

OTHER PUBLICATIONS

International Search Report, International Application No. PCT/FI2017/050313, dated Jul. 7, 2017.

(Continued)

*Primary Examiner* — Saul Rodriguez
*Assistant Examiner* — Ashley K Romano
(74) *Attorney, Agent, or Firm* — Fildes & Outland, P.C.

(57) ABSTRACT

An apparatus for loading a cargo space includes a conveyor and a stacker for stacking goods in the cargo space. The stacker is before the conveyor. In addition, a buffer conveyor is between the stacker and the conveyor to permit the uninterrupted operation of the stacker. A transfer conveyor is between the buffer conveyor and the conveyor for moving a stack from the buffer conveyor to the conveyor.

12 Claims, 5 Drawing Sheets

(56) References Cited

U.S. PATENT DOCUMENTS

2018/0159165 A1* 6/2018 Cox .................. H01M 10/0413

FOREIGN PATENT DOCUMENTS

| CN | 102448857 | 5/2012 |
| CN | 202492205 | 10/2012 |
| CN | 103863831 | 6/2014 |
| CN | 103958382 | 7/2014 |
| CN | 103964211 | 8/2014 |
| CN | 204162111 | 2/2015 |
| GB | 1574296 | 9/1980 |
| JP | S60153337 | 8/1985 |
| JP | 63-82233 | 4/1988 |
| JP | S3208437 | 8/1988 |
| WO | 2007/071831 | 6/2007 |
| WO | 2013/049945 | 4/2013 |
| WO | 2016/041572 | 3/2016 |

OTHER PUBLICATIONS

English language abstract of JP 63-82233.
English language abstract of WO 2016/041572.
English language abstract of CN 204162111.
Supplementary European Search Report dated Nov. 22, 2019 in corresponding European patent application No. 17788879.9.
Chinese Search Report dated Nov. 19, 2019 in corresponding Chinese patent application No. 201780025579.9.
Chinese Office Action dated Nov. 28, 2019 in corresponding Chinese patent application No. 201780025579.9 and English translation.
English language abstract of JP S60153337.
English language abstract of CN103863831.
English language abstract of CN201343171.
English language abstract of CN202492205.
English language abstract of CN103964211.
English language abstract of JP S63208437.

* cited by examiner

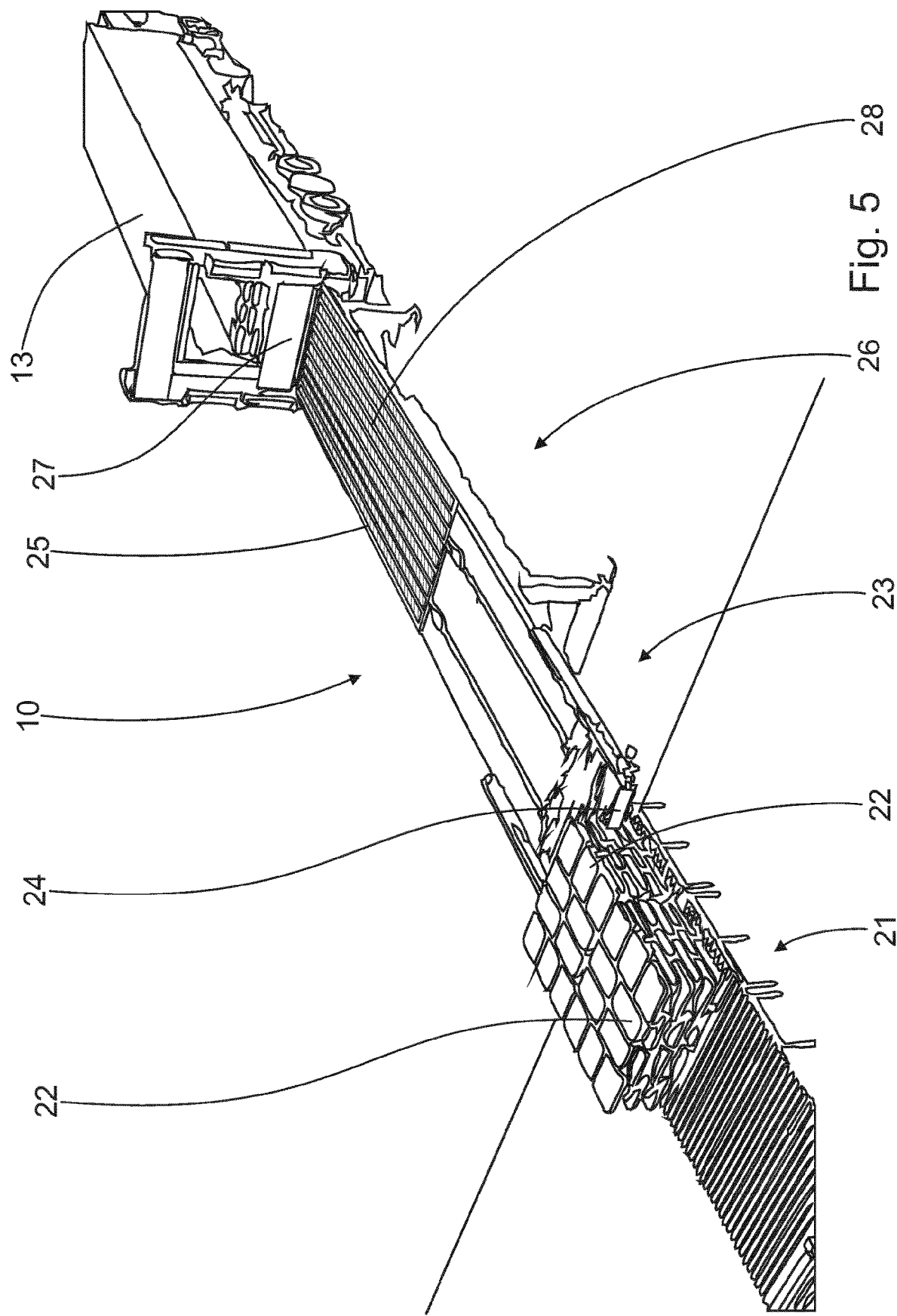

APPARATUS FOR LOADING A CARGO SPACE

CROSS-REFERENCE TO RELATED APPLICATIONS

This application claims benefit of priority from International Patent Application No. PCT/FI2017/050313 filed Apr. 25, 2017, which claims benefit of priority from Finland Patent Application No. 20165357 filed Apr. 25, 2016, both of which are incorporated by reference in their entirety.

FIELD OF THE INVENTION

The invention relates to an apparatus for loading a cargo space, which apparatus includes a conveyor and stacker for stacking goods in the cargo space, and in which apparatus the stacker is before the conveyor, and between the stacker and conveyor there is a buffer conveyor to permit the uninterrupted operation of the stacker.

BACKGROUND OF THE INVENTION

WO-application publication number 2016/041572 discloses an apparatus for loading a cargo space. In it sacks are loaded, but other suitable piece goods of a definite shape can also be loaded. For example, the apparatus is used to transport the sacks directly from production singly into the cargo space. The core of the apparatus is a conveyor that moves longitudinally and vertically, which makes the desired loading pattern from the sacks. In practice, there is a stacker at the end of the conveyor. Thus a stable load is formed by stacking the sacks on top of each other. For example, one kind of loading pattern is formed from ten sacks and the next layer is slightly different. Thus, being set in different ways transversely and longitudinally, the sacks of the different layers bind each other together.

The conveyor is supported on the ceiling structures, which requires sturdy structures. In addition, as loading comes from above, the cargo space should not have a roof. The walls and even the edges limit loading. For example, when eight ten-sack layers are finished, the conveyor must be moved backwards one stack. When the cargo space is filled, the conveyor is stopped and the next cargo space is moved under the conveyor.

The disclosed apparatus is suitable only for certain kinds of cargo spaces that are open on top. In addition, loading in steps lengthens the loading time. When changing the cargo space, the apparatus must be stopped, which further lengthens the loading time and reduces the efficiency of the apparatus. The apparatus also demands special constructions in both the apparatus and the cargo space.

U.S. Pat. No. 4,171,178 discloses an automatic apparatus for handing stacks of sacks. A stack is formed of individual sacks, which is finally moved into the cargo space. The apparatus includes a buffer conveyor, on which the stacks formed can await loading. As one stack at a time is moved, the vehicle must be in place for a long time. In addition, gaps remain between the stacks loaded at different times, which makes the load unstable. The conveyor that moves in two backwards-and-forwards directions is also complex. In addition, the apparatus disclosed is unsuitable for loading intermodal containers that only open at the end.

SUMMARY OF THE INVENTION

The invention is intended to create a new type of apparatus for loading a cargo space, which is simple and efficient and which is suitable for loading different kinds of cargo space. The characteristic features of the apparatus according to the present invention are a conveyor and a stacker for stacking goods in a cargo space. The stacker is before the conveyor. A buffer conveyor is between the stacker and the conveyor to permit the uninterrupted operation of the stacker. A transfer conveyor is between the buffer conveyor and the conveyor for moving a stack from the buffer conveyor to the conveyor. The efficiency of the apparatus according to the invention is achieved by uninterrupted operation. In addition, the apparatus can be set on a base without special support structures. At the same time, the apparatus is compact and can be used to load all kinds of cargo spaces.

BRIEF DESCRIPTION OF THE DRAWINGS

In the following, the invention is described in detail with reference to the accompanying drawings showing one embodiment of the invention, in which FIG. 5 shows the apparatus according to the invention in the final stage of loading a cargo space.

DETAILED DESCRIPTION OF THE INVENTION

The figures show an apparatus according to the invention, from different points at different stages of loading. The apparatus is intended for loading a cargo space. The apparatus includes a conveyor 10 and a stacker 11 for stacking goods 12 in the cargo space 13. The goods to be stacked are, for example, sacks, which are used particularly for packing cement and fertilizer. For example, at a cement factory cement is led to a sacking machine, from where the filled sacks are led to a stacker. The stacker can be a pallet filler, by which a stack is formed on a pallet or some other base. Alternatively, according to the prior art the stacker can stack the sacks directly in the cargo space, without pallets.

Figure 1:
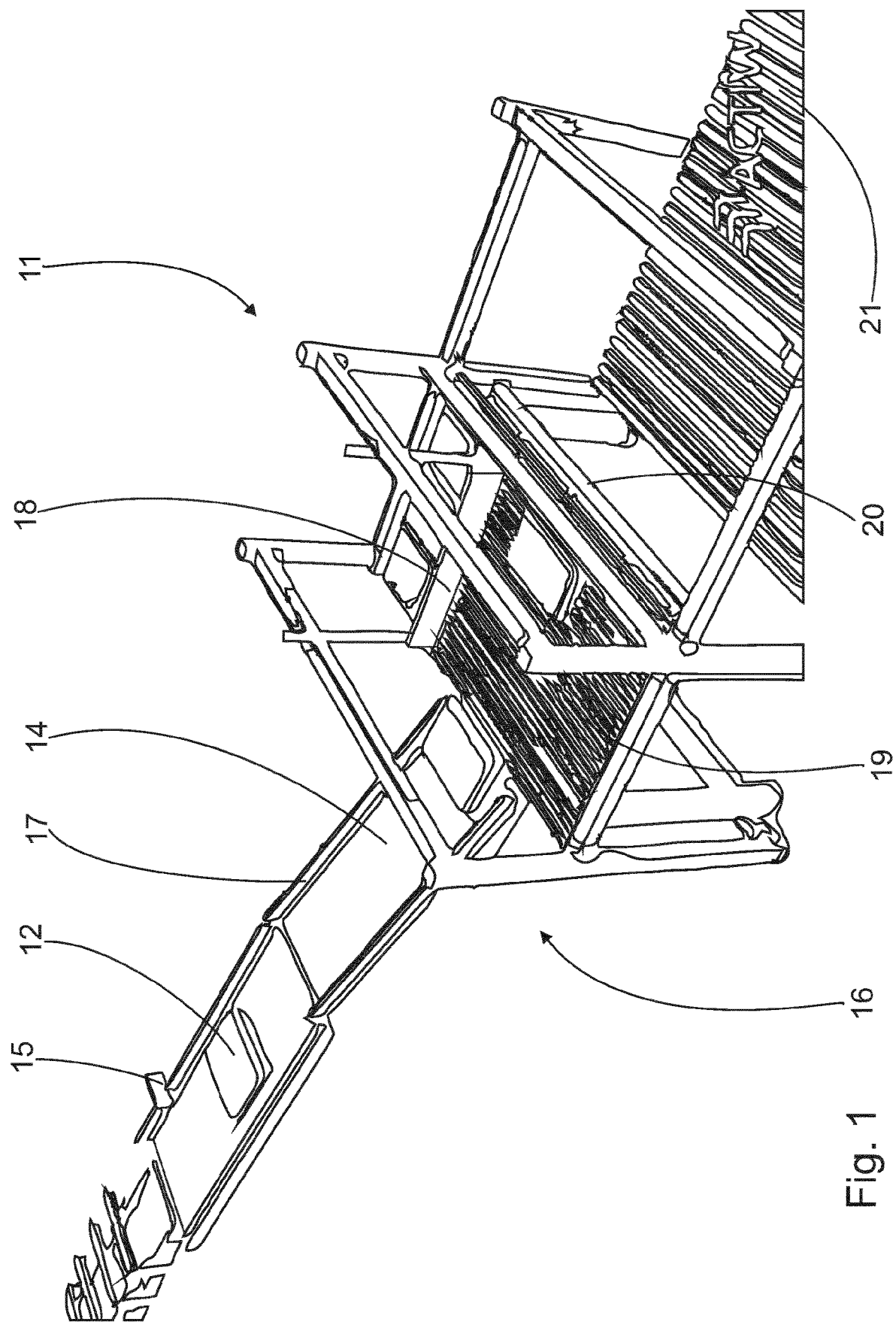
FIG. 1 shows the start of the apparatus according to the invention.

The stacker 11 is before the conveyor 10. In that case, a stack is first formed and then moved to the cargo space. In FIG. 1, the goods 12, in this case sacks, come directly from production to the apparatus according to the invention. First there is a short slide 14, by means of the bumper 15 on which the sack is, if necessary, turned through 90°. In addition, in the stacker 11 there is a divider 16 for transferring the goods 12 to form the desired loading pattern. Here the divider is in two parts, in which the first is a primary divider 17. The sacks are guided by the primary divider into two positions, which are located in the centre part of the stacker. The second is a secondary divider 18, by which the sacks guided to the centre part are moved to the edge areas to form the desired loading pattern. Both dividers are simple and can be controlled by limit switches.

In FIG. 1, a layer of sacks is formed on the loading base 19. Below the loading base 19 is a stacking level 20, which descends layer by layer. In FIG. 1, there is already one layer of sacks on the stacking level 20. When the next layer is ready, the loading base is moved out from between the layer, thus forming a two-layered stack. In order to form the next layer, the loading base is moved backwards, before which the stacking level has descended by one layer. The stacker 11 is thus preferably of the elevator type.

In the invention, the stacker comes before the conveyor. In addition, between the stacker 11 and the conveyor 10 there is a buffer conveyor 21 to permit the uninterrupted operation of the stacker 11. In this apparatus too the conveyor must be stopped at least for the duration of changing the cargo space. Thanks to the buffer conveyor, the stacker can, however, operate without interruption, which increases the apparatus's capacity and permits continuous production. In addition, thanks to the buffer conveyor load formation can continue even during loading operations.

Figure 2:
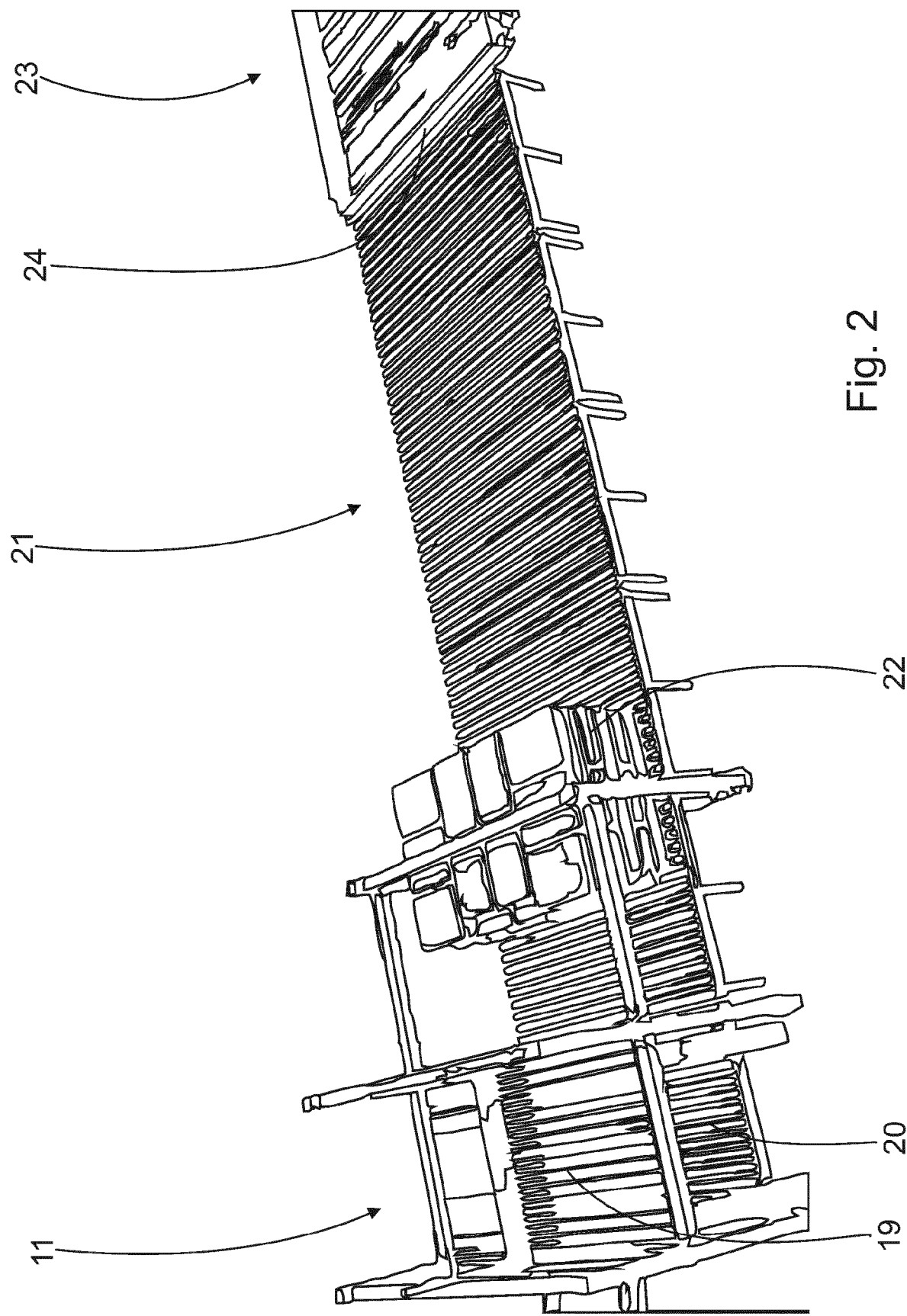
FIG. 2 shows the middle of the apparatus according to the invention.

The buffer conveyer 21 appears partly in FIG. 1 and entirely in FIG. 2, in which the stack 22 has just moved from the stacker 11 to the buffer conveyor 21. Preferably the buffer conveyor 21 is integrated with the stacker 11, which simplifies the construction of the apparatus and facilitates the control of the buffer conveyor and the stacker.

Figure 3:
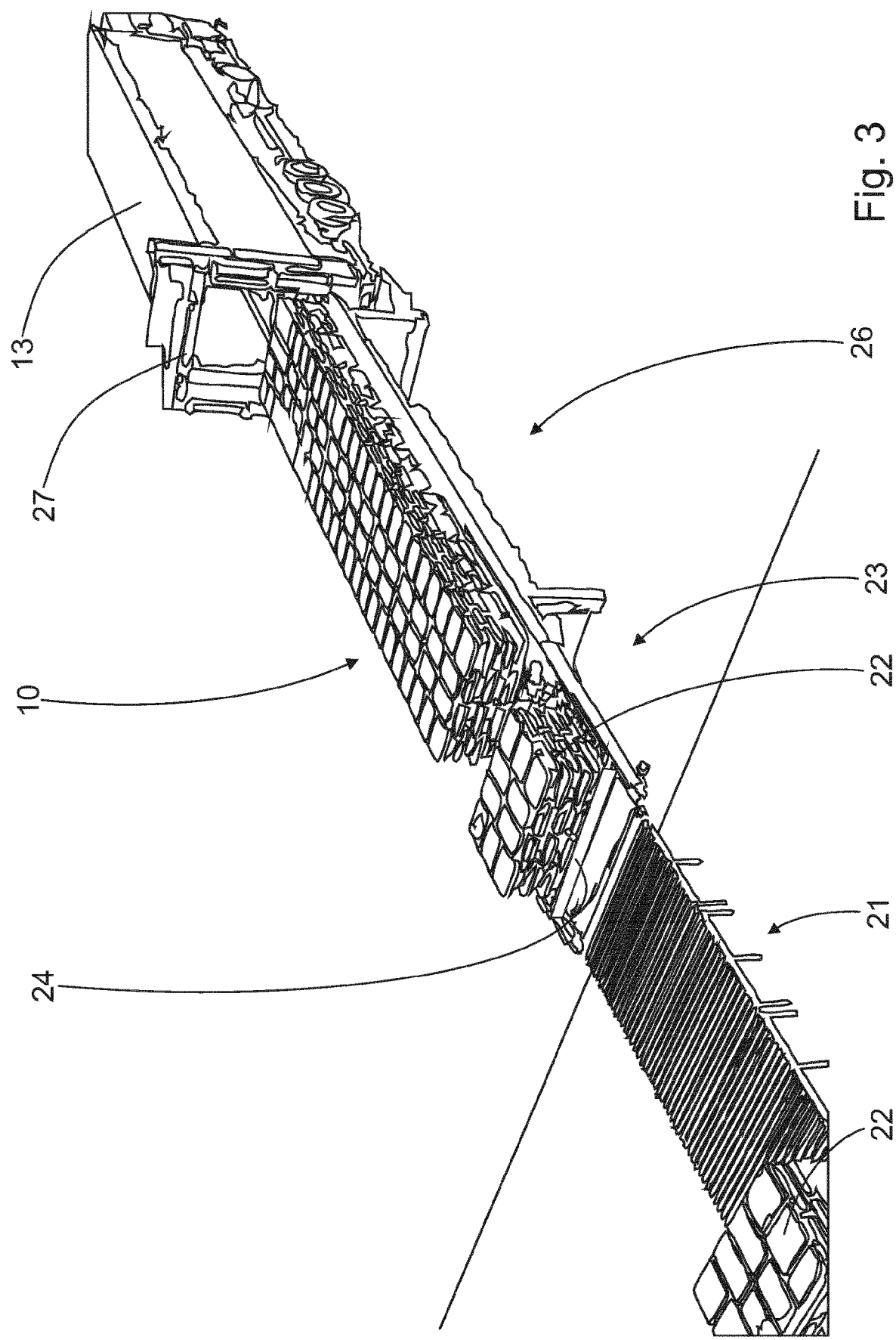
FIG. 3 shows the end of the apparatus according to the invention.

FIG. 3 shows the end of the apparatus according to the invention. Here, between the buffer conveyor 21 and the conveyor 10 is a transfer conveyor 23 for moving the stack 22 from the buffer conveyor 21 to the conveyor 10. The buffer conveyor can be a roller track operating by gravity, in which the stacks move on the buffer conveyor always one stack at a time to the transfer conveyor. Part of the transfer conveyor 23 and the transveyor 24 can be seen at the right-hand side of FIG. 2. More specifically, the transveyor is arranged to move one stack at a time to the conveyor 10. When the stack 22 is on the transfer conveyor 23, the stack 22 is pushed by the transveyor 24 onto the conveyor 10 (FIG. 3). The transfer conveyor 23 is integrated with the conveyor 10, so that the frame structure of the conveyor can be exploited.

Figure 4:
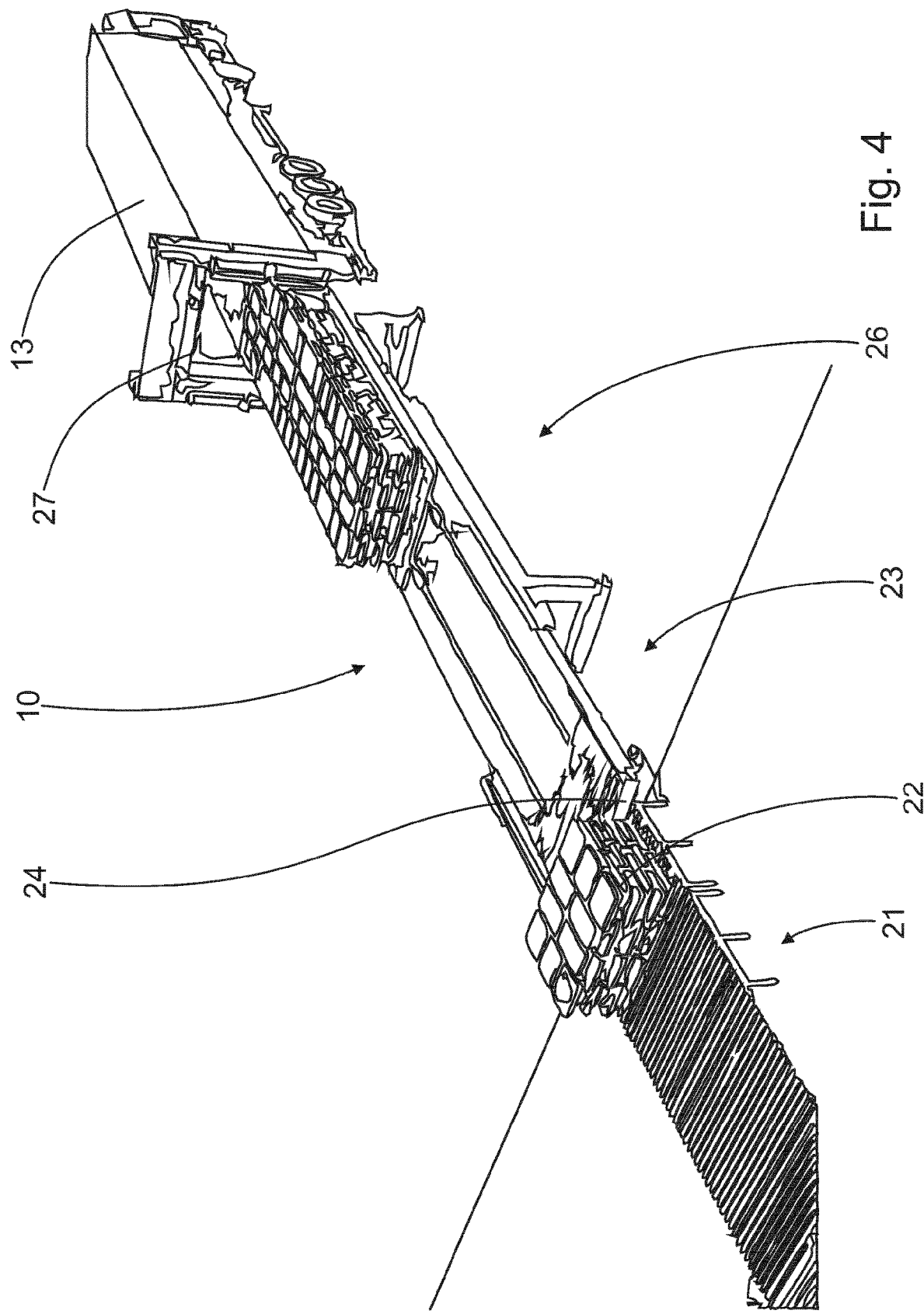
FIG. 4 shows the apparatus according to the invention when loading a cargo space.

In the embodiment shown of the apparatus according to the invention, a conveyor 10, which is a loading device 26 comprising a transfer plate 25, is utilized. In FIG. 3, eight stacks are already on the transfer plate 25 and a ninth is being moved there. The load formed of stacks 22 on the transfer plate 25 is arranged to be moved at one time into the cargo space 13. The load is the length of the cargo space 13, so that the whole cargo space is loaded at one time. In FIG. 4, half of the transfer plates and the load are in the cargo space and the next stack is already waiting on the buffer conveyor 21. The load is supported by a gate 27 and the transfer plate 25 is pulled out empty from under the load and back to the loading apparatus 26 while the sacks remain stacked in the cargo space. In FIG. 5, there are already two stacks 22 waiting on the buffer conveyor 21. Preferably the transfer conveyor 23 is integrated with the loading apparatus 26, which simplifies the construction of the apparatus and facilitates the control of the transfer conveyor and the loading apparatus.

In the invention, the surface of the transfer plate 25 on the side of the load units 11 is covered with rolling elements 28 to permit movement between the transfer plate 25 and the goods 12. The rolling elements are, for example, short, freely rotating rolls or narrow rollers, which cover the entire transfer plate. Here the rollers are arranged in rows. In the embodiment shown, the sacks are stacked and loaded without pallets. With small alterations, the apparatus can also be used to stack pallets, which are moved to the transfer plate and then to the cargo space.

Preferably the loading device 26 descends in the direction of the cargo space 13. The stacks then move on the transfer plate party by gravity, when the power of the transveyors will suffice to move several consecutive stacks. In addition, the working movement of the conveyor 10 is in the longitudinal direction of the cargo space 13. The apparatus can then be used to load the cargo space starting from the back, so that closed intermodal containers can be loaded easily.

Generally speaking, the capacity of the buffer conveyor 21 is 35-65%, preferably 45-55% of the capacity of the loading device 26. Plenty of time then remains for forming the load and changing to a new cargo space. In the embodiment shown, there are nine stacks in the load and five stacks fit onto the buffer conveyor. In each of the load's stacks there are six ten-sack layers. If the mass of one sack is 50 kilograms the mass of the load will be 27 000 kilograms, i.e. 27 tonnes. If five minutes are reserved for forming the load, three minutes for changing the cargo space, and two minutes for moving the transfer plate in and out of the cargo space, one loading cycle will take ten minutes. Six cargo spaces can then be loaded in an hour, which is more than 3000 sacks an hour.

Efficiency can be further increased by arranging the transfer conveyor to feed two loading apparatuses. More time will then be available for positioning the cargo spaces, forming the load, and moving the transfer plates. At the same time, the stacker can operate uninterruptedly.

The apparatus according to the invention can be used to load almost any kind of cargo space whatever. It will be sufficient if the cargo space is open at one end. In addition, the loading pattern can be chosen freely and stacking will be continuous for the entire duration of loading. Sacks, for example, can then be loaded directly from production to intermodal containers. In addition, the apparatus can be supported simply on the base without special structures.

The invention claimed is:

1. Apparatus for loading a cargo space, the apparatus comprising:
   a conveyor loading device comprising a transfer plate;
   a stacker for stacking goods, the stacker being disposed before the conveyor loading device in a conveyance direction;
   a buffer conveyor disposed between the stacker and the conveyor loading device to permit the uninterrupted operation of the stacker, and
   a transfer conveyor disposed between the buffer conveyor and the conveyor loading device, for forming a stack of stacked goods and moving the stack of stacked goods from the buffer conveyor to the transfer plate;
   wherein the transfer conveyor conveys a load formed of said stacks and having the same length as the cargo space onto the transfer plate for movement at one time into the cargo space starting from the back of the cargo space.

2. Apparatus according to claim 1, characterized in that a divider is in the stacker for moving the goods to form the desired loading pattern.

3. Apparatus according to claim 1, characterized in that the stacker is of the elevator type.

4. Apparatus according to claim 1, characterized in that the transfer conveyor includes a transveyor, which is arranged to move one stack at a time to the conveyor loading device.

5. Apparatus according to claim 1, characterized in that the buffer conveyor is integrated with the stacker.

6. Apparatus according to claim 1, characterized in that the transfer conveyor is integrated with the conveyor loading device.

7. Apparatus according to claim 1, characterized in that the surface of the side of the transfer plate facing the load units is covered with rolling elements in order to permit movement between the transfer plate and the goods.

8. Apparatus according to claim 1, characterized in that the conveyor loading device descends in the direction of the cargo space.

9. Apparatus according to claim 1, characterized in that the capacity of the buffer conveyor is 35-65% of the capacity of the conveyor loading device.

10. Apparatus according to claim 1, characterized in that the transfer conveyor is integrated with the conveyor loading device.

11. Apparatus according to claim 1, characterized in that the working movement of the conveyor loading device is in the longitudinal direction of the cargo space.

12. Apparatus according to claim 1, characterized in that the transfer conveyor is connected to two conveyor loading devices.

\* \* \* \* \*